(12) United States Patent
Flick

(10) Patent No.: US 6,720,868 B2
(45) Date of Patent: Apr. 13, 2004

(54) BACK-UP WARNING SYSTEM IN A LICENSE PLATE HOLDER AND RELATED METHOD

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 0 days.

(21) Appl. No.: 10/117,540

(22) Filed: Apr. 4, 2002

(65) Prior Publication Data

US 2002/0180597 A1 Dec. 5, 2002

Related U.S. Application Data

(63) Continuation-in-part of application No. 09/870,346, filed on May 31, 2001.

(51) Int. Cl.[7] .................................. B60Q 1/00
(52) U.S. Cl. ................ 340/435; 340/436; 340/437; 340/693.5
(58) Field of Search ................ 340/436, 435, 340/438, 437, 693.5, 901, 903, 904; 307/10.8; 180/271, 275; 367/96, 112, 909

(56) References Cited

U.S. PATENT DOCUMENTS

| | | | |
|---|---|---|---|
| 1,652,664 A | 12/1927 | Fraiser | 40/209 |
| 1,887,087 A | 11/1932 | Frizner | 40/209 |
| D163,328 S | 5/1951 | Rothman | 222/399 |
| 4,015,232 A | 3/1977 | Sindle | 340/1 T |
| 4,278,962 A | 7/1981 | Lin | 340/34 |
| D274,807 S | 7/1984 | Stansbury, Jr. et al. | D12/193 |
| 4,636,997 A | 1/1987 | Toyama et al. | 367/140 |
| 4,797,673 A | 1/1989 | Dombrowski | 340/904 |
| 4,851,813 A | 7/1989 | Gottlieb | 340/474 |
| 4,864,298 A | 9/1989 | Dombrowski | 340/904 |
| 4,903,007 A | 2/1990 | Gottlieb | 340/474 |
| 4,910,512 A | 3/1990 | Riedel | 340/943 |
| D311,167 S | 10/1990 | Ching-Hwei | D12/193 |
| 4,980,869 A | 12/1990 | Forster et al. | 367/99 |
| 5,028,920 A | 7/1991 | Dombrowski | 340/904 |

(List continued on next page.)

OTHER PUBLICATIONS

S&S Distributing, LLC, Model 1500 License Plate Frame Mount, 2001, available at www.guardianalert.com/1024/1500.htm.
S&S Distributing, LLC, Frequently Asked Questions, 2001, available at www.guardianalert.com/1024/FAQ.htm.
S&S Distributing, LLC, Installation Instructions for License Plate Frame Mount Model 1500, available at www.guardianalert.com.
S&S Distributing, LLC, 9–5–3 Testing Instructions Model 1500 License Plate Frame Mount available at www.guardianalert.com.
S&S Distributing, LLC, Capabilities and Technology available at www.guardianalert.com/1024/tech/htm.
Intplus, Smartpark 2000 Back–up System S110585 Computer Parking System, 2001, available at www.superinventos.com.

Primary Examiner—Anh V La
(74) Attorney, Agent, or Firm—Allen, Dyer, Doppelt, Milbrath & Gilchrist, P.A.

(57) ABSTRACT

A back-up warning system for a vehicle having a back-up lighting circuit includes a license plate holder including a housing, and a proximity sensor and external audible indicator carried by the housing. The back-up warning system also includes an internal indicator for providing an internal indication of proximity to an object based upon the proximity sensor. The back-up warning system may be connected to the back-up lighting circuit so that the proximity sensor is powered and operable to detect proximity of the object adjacent the license plate holder when a reverse transmission position is selected.

32 Claims, 3 Drawing Sheets

U.S. PATENT DOCUMENTS

| | | |
|---|---|---|
| 5,047,747 A | 9/1991 | Gottlieb .................... 340/463 |
| 5,059,946 A | 10/1991 | Hollowbush ................ 340/435 |
| 5,076,384 A | 12/1991 | Wada et al. ................ 180/169 |
| 5,160,927 A | 11/1992 | Cherry et al. .............. 340/904 |
| 5,181,019 A | 1/1993 | Gottlieb et al. ............. 340/474 |
| 5,198,798 A | 3/1993 | Lietzow et al. ............. 340/539 |
| RE34,773 E | 11/1994 | Dombrowski ............... 340/904 |
| 5,440,288 A | 8/1995 | Gottlieb et al. ............. 340/463 |
| 5,495,137 A | 2/1996 | Park et al. .................. 310/331 |
| 5,515,026 A | 5/1996 | Ewert ........................ 340/436 |
| 5,515,285 A | 5/1996 | Garrett, Sr. et al. ........ 364/460 |
| 5,531,118 A | 7/1996 | Knoll et al. .................. 73/628 |
| 5,574,426 A * | 11/1996 | Shisgal et al. .............. 340/435 |
| 5,619,074 A | 4/1997 | Berch et al. ................ 307/10.2 |
| 5,650,765 A | 7/1997 | Park .......................... 340/436 |
| D382,240 S | 8/1997 | Francis ...................... D12/193 |
| D396,439 S | 7/1998 | Turnquest .................. D12/193 |
| 5,838,227 A | 11/1998 | Murray ..................... 340/425.5 |
| 5,844,471 A | 12/1998 | Daniel ....................... 340/436 |
| 5,894,272 A | 4/1999 | Brassier et al. ............. 340/602 |
| D411,499 S | 6/1999 | Porter ....................... D12/193 |
| 5,914,651 A | 6/1999 | Smalls ....................... 340/436 |
| 6,028,505 A | 2/2000 | Drori ......................... 340/426 |
| 6,049,273 A | 4/2000 | Hess ......................... 340/539 |
| 6,064,302 A * | 5/2000 | Peterson et al. ............ 340/463 |
| 6,087,953 A * | 7/2000 | DeLine et al. ............. 340/815.4 |
| 2002/0011928 A1 | 1/2002 | Williams .................... 340/436 |

* cited by examiner

BACK-UP WARNING SYSTEM IN A LICENSE PLATE HOLDER AND RELATED METHOD

RELATED APPLICATIONS

The present application is a continuation-in-part of U.S. patent application Ser. No. 09/870,846 filed on May 31, 2001, the entire contents of which are incorporated herein by reference.

FIELD OF THE INVENTION

The present invention relates to the field of vehicles, and, more particularly, to vehicle warning systems.

BACKGROUND OF THE INVENTION

Audible alert systems are used in various types of motor vehicles to alert pedestrians, bicyclists, etc. that a vehicle is backing up. This is important because the driver of the vehicle may not be able to see a person behind the vehicle if the person is in a so-called blind-spot. As such, these types of systems have become commonplace in large delivery trucks, heavy machinery, etc., where it may be particularly hard to see a person behind the vehicle.

Such systems are also becoming more popular in passenger vehicles, such as cars and small trucks. For example, U.S. Pat. No. 4,851,813 to Gottlieb discloses a combination back-up light and sound emitting device for an automotive vehicle including a housing having a base at one end and a socket at the other end. A light bulb is mounted in the socket of the housing and a sound emitting device is also mounted in the housing. The base may be inserted in a vehicle back-up bulb socket so that the sound emitting device and the light bulb are activated when the vehicle is in reverse.

Some back-up warning systems include a transceiver mounted on a rear end of a vehicle for detecting objects close to the vehicle while the vehicle is in reverse. For example, U.S. Pat. Nos. RE 34,773; 4,797,673; 4,864,298; and 5,028,920 to Dombrowski disclose a driver alerting device including a transceiver mounted on the rear end of a vehicle (e.g., on the bumper) that directs a wave output rearwardly from the vehicle. Return signals from objects within range of the transceiver are picked up by an antenna and supplied to the transceiver. Any resulting Doppler shift detected by the transceiver causes the transceiver to provide an audible alert within the passenger compartment.

The device may be connected for activation when the vehicle transmission is engaged in the reverse gear. One limitation of such devices is that they may be relatively bulky and require mounting on the back of the vehicle in a conspicuous location, such as on the vehicle's bumper. Accordingly, these devices may be unsightly and they may also require screws, etc. to securely fasten the device to the vehicle. Thus, there may be a significant potential for damage to the vehicle during installation, and this process may take a substantial amount of time to complete. Further, such devices protrude from the bumper and may therefore be damaged or even knocked off the vehicle. Additionally, not all vehicles have a suitable mounting location for such devices.

A combined license plate frame and reverse warning alarm is illustrated in U.S. Pat. No. Des. 274,807 to Stansbury. As mentioned above, however, a reverse warning alarm may be inadequate to warn a driver of objects positioned rearward of the vehicle. A back-up sensor in a license plate holder is illustrated in U.S. Pat. No. Des 411,499 to Porter. Again, a back-up sensor alone may be insufficient to warn a driver of objects positioned rearward of the vehicle.

A license plate frame mount system offered by Sense Technologies, Inc. of Omaha, Nebr. under model designation 1500 includes license plate frame and a proximity sensor carried by the frame to provide a driver with an audible and visual warning of objects positioned behind the vehicle. The license plate frame mount, however, fails to include an external audible alarm, such as for warning pedestrians, for example, of the vehicle's rearward motion. While the license plate frame mount by Sense Technologies can be used along with physically separate sound emitting devices described above, such a configuration may create installation complications, especially for routing wires between separate devices.

SUMMARY OF THE INVENTION

In view of the foregoing background, it is therefore an object of the invention to provide a backup warning system that is relatively easy to install and that provides warnings both internal to the vehicle and external from the vehicle.

This and other objects, features, and advantages in accordance with the present invention are provided by a back-up warning system for a vehicle that includes a license plate holder; a housing carried by the license plate holder; and a proximity sensor and an external audible indicator carried by the housing. More particularly, the back-up warning system may include a back-up lighting circuit that is selectively powered upon selection of a reverse transmission position. The license plate holder may include a generally rectangular body portion with an opening therein to mount and display the license plate and at least one bracket portion connected to the body portion for facilitating mounting of the license plate holder to the rear of the vehicle.

The back-up warning system may further include the housing connected to the license plate holder. The external audible indicator may be carried by the housing and connected to the back-up lighting circuit to be powered in parallel therewith for generating an external audible indication based upon selection of the reverse transmission position. The proximity sensor is also carried by the housing for sensing proximity of an object positioned rearward of the license plate holder.

An internal indicator may be positioned within the vehicle and cooperate with the proximity sensor to generate an indication of proximity of the object to the license plate holder. More specifically, the vehicle may include a vehicle passenger compartment and the internal indicator may be positioned within vehicle passenger compartment. The internal indicator may be a visual warning indicator. The vehicle may also include a rearview mirror, and the visual warning indicator may be carried by the rearview mirror.

The back-up warning system may also include a wireless communications link connecting the proximity sensor and the internal indicator. The wireless communications link may include a wireless transmitter connected to the proximity sensor and a wireless receiver within the vehicle and connected to the internal indicator. The external audible indicator may be connected to the proximity sensor and generate an audible indication relating to proximity of the object to the license plate holder. Alternately, the external audible indicator may provide a constant warning sound, not based on proximity.

The proximity sensor may be provided by a radar sensor. The back-up warning system may further include sensing circuitry carried by the proximity sensor. The sensing circuitry may include a signal emitter for emitting signals, and a collector for collecting reflected signals from the object positioned rearward of the license plate holder.

A method aspect of the invention is for making a back-up warning system for a vehicle having a back-up lighting circuit selectively powered upon selection of a reverse transmission position. The method may include providing a license plate holder and a housing connected thereto, and positioning an external audible indicator in the housing. The method may also include connecting the external audible indicator in parallel to the back-up lighting circuit for generating an external audible indication based on selection of the reverse transmission position, and positioning a proximity sensor in the housing for sensing objects positioned rearward of the license plate holder. The method may further include positioning an internal indicator within the vehicle passenger compartment to cooperate with the proximity sensor and generating an indication of proximity of an object to the license plate holder.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notations are used to indicate similar elements in alternative embodiments.

Figure 1:
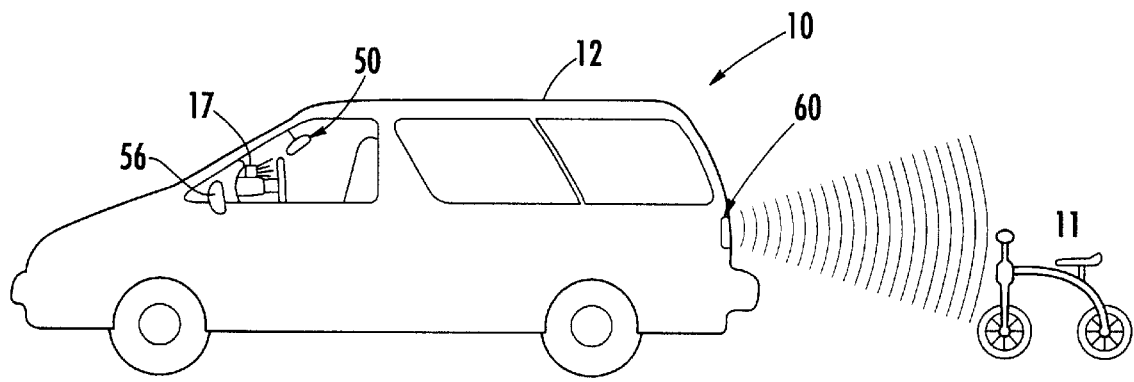
FIG. 1 is a perspective view of a vehicle including a back-up warning system according to the present invention.
Figure 2:
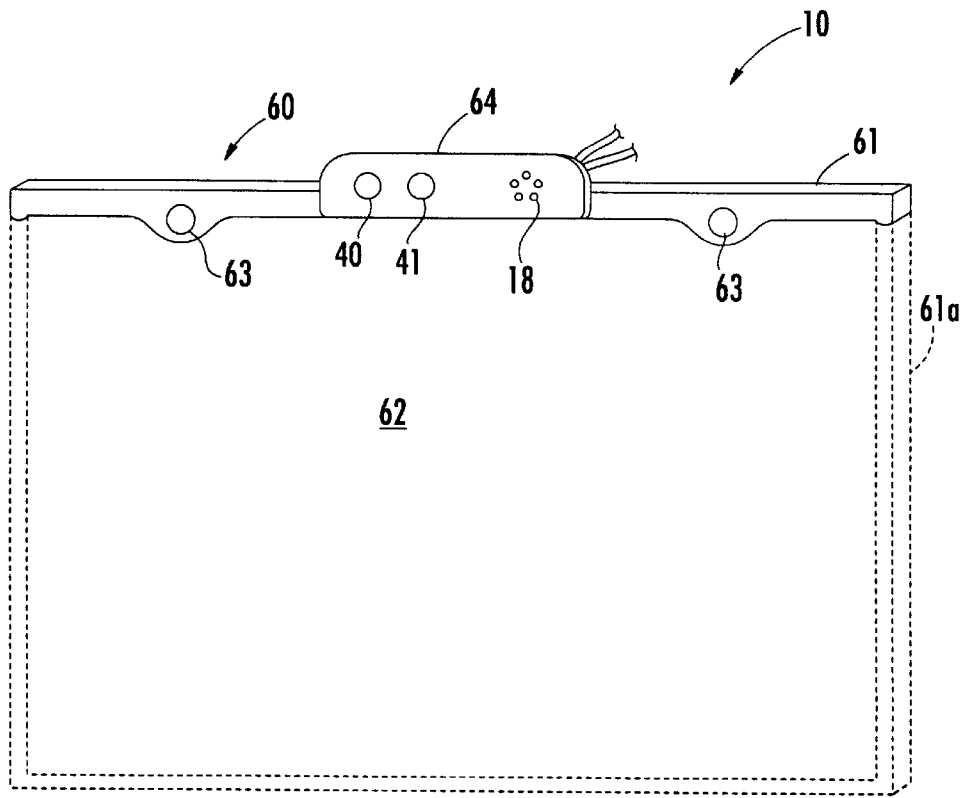
FIG. 2 is a perspective view of the license plate holder as shown in FIG. 1.
Figure 3:
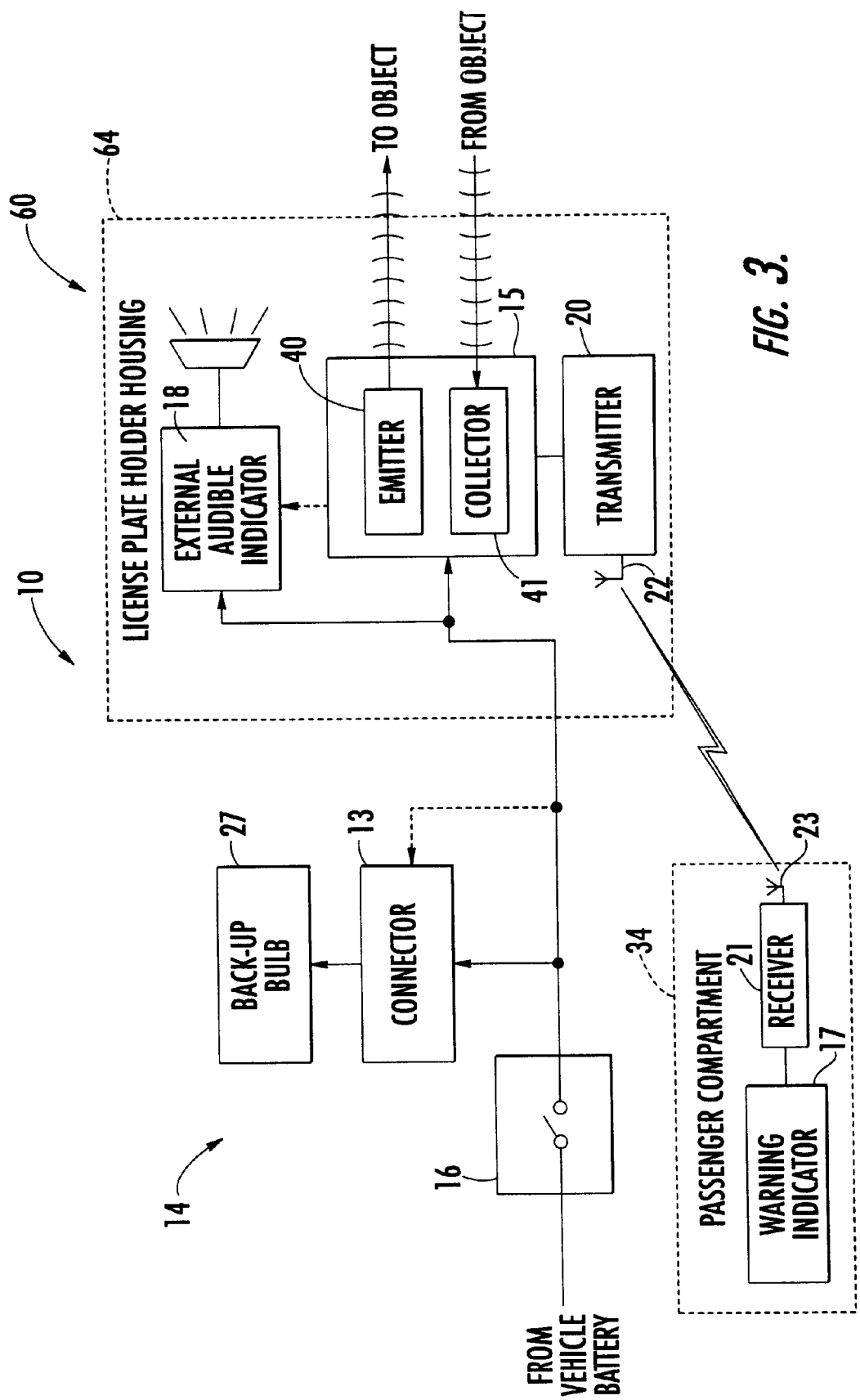
FIG. 3 is a schematic block diagram of the back-up warning system illustrated in FIG. 2.

Referring initially to FIGS. 1–3, a back-up warning system 10 for a vehicle 12 comprising a back-up lighting circuit 14 is now described. The back-up warning system 10 is connected to the vehicle 12 via the back-up lighting circuit 14. The back-up lighting circuit 14 illustratively includes a back-up switch 16 connecting the back-up bulb 27 to the battery of the vehicle 12 when the vehicle transmission is placed in reverse. Accordingly, the back-up switch 16 is typically associated with the transmission or gear selector of the vehicle 12. The back-up lighting circuit 14 is therefore selectively powered upon selection of the reverse transmission position.

The back-up warning system 10 includes a license plate holder 60 for mounting and displaying a license plate. The license plate holder 60 may be connected to a rear portion of the vehicle 12 to indicate proximity of an object 11, such as a tricycle, for example, adjacent the rear of the vehicle.

The license plate holder 60 illustratively includes a body portion 61 that will extend substantially along the upper portion of a license plate being mounted and displayed. Although the license plate holder 60 is described as including the body portion 61 that extends along the upper portion of the license plate, it will be understood by those skilled in the art that the license plate holder may also include side and bottom portions 61a with an opening 62 therein to mount and display the license plate (side and bottom portions illustrated by the dashed lines). The license plate holder 60 also illustratively includes at least a pair of brackets 63 connected to the body portion 61 for facilitating mounting of the license plate holder to the rear of the vehicle 12.

The back-up warning system 10 includes a housing 64 connected to the license plate holder 60. The external audible indicator 18 is carried by the housing 64 and is connected to the back-up lighting circuit 14 to be powered in parallel therewith for generating an external audible indication based upon selection of the reverse transmission position. To lessen the complication of installation of the back-up warning system 10, the external audible indicator 18 is illustratively carried by the housing 64 along with a proximity sensor 15. Therefore, simply connecting the back-up warning system 10 to the back-up lighting circuit 14, both the proximity sensor 15 and the external audible indicator 18 are powered when a reverse transmission position is selected. The need to connect several different components to the back-up lighting circuit 14 is accordingly eliminated. Although the external audible indicator 18 is illustrated as being carried by the housing 64, it shall be understood by those skilled in the art that the external audible indicator may be positioned adjacent the housing, i.e., connected to the back-up lighting circuit 14, but not connected to the housing in some other embodiments.

As previously noted, the proximity sensor 15 is also illustratively carried by the housing 64 for sensing proximity of an object 11 positioned adjacent the license plate holder 60. The proximity sensor 15 includes an emitter 40 and a collector 41. The emitter 40 advantageously emits a signal to detect an object 11 positioned adjacent the license plate holder 60. The signal is reflected off of the object 11 and is returned to the proximity sensor. The collector 41 then collects the reflected signal to indicate the proximity of the object 11 to the license plate holder 60. It will be understood by those skilled in the art that the proximity sensor 15 may include more than one emitter/collector pair such as to advantageously widen the effective detection range, for example. The proximity sensor 15 may be a radar sensor, though other suitable sensors known to those skilled in the art may also be used, such as light sensors, sound sensors, etc.

The back-up lighting circuit 14 is powered when the reverse transmission position is selected, and therefore, the external audible indicator 18 and the proximity sensor 15 are also powered when the back-up lighting circuit is powered. The back-up lighting circuit 14 of the vehicle 12 includes a connector 13, i.e., a back-up bulb socket for receiving a back-up light bulb 27. The connection to the back-up lighting circuit 14 can be made along the wiring of the back-up lighting circuit or can be made directly at the connector 13 (as indicated by the dashed line). For example, the back-up warning system 10 may include a plug, not shown, to be mated with the connector 13.

The back-up warning system 10 also includes an internal indicator 17 that provides the driver of the vehicle 12 with an internal indication of proximity of an object 11 adjacent the license plate holder 60. More specifically, the vehicle 12 includes a vehicle passenger compartment 34, and the internal indicator 17 may be positioned therein. It will also be understood by those skilled in the art that the internal indicator 17 may be positioned in a trunk of the vehicle 12, for example, or within any other area of the vehicle so as to provide an indication within the vehicle of the proximity of the object 11 to the license plate holder 60.

As further illustrated in FIG. 3, a wireless communication link may be used to connect the proximity sensor 15 and the internal indicator 17. The wireless communications link may include a wireless transmitter 20 connected to the proximity sensor 15 and a wireless receiver 21 positioned within the vehicle passenger compartment 34 and connected to the internal indicator 17. The wireless transmitter 20 and the wireless receiver 21 may illustratively communicate via respective antennas 22, 23. As a result, the internal indicator 17 may be relatively easily installed within the vehicle passenger compartment 34 without the need to run wires therein. The internal indication may advantageously be provided by an audible internal indication, a visual internal indication, or both.

Those of skill in the art will also understand how to select and/or adjust the range of various proximity sensors 15 for a given application. Generally speaking, it is preferable to have the range of the proximity sensor 15 set so that objects 11 are detected from a far enough distance to give the driver adequate time to stop before hitting the object. On the other hand, it is also preferable not to set the range too far so that a internal indication is generated in situations where there is little likelihood of backing into the object 11.

A battery may be associated with the wireless receiver 21 to provide power thereto. Another possibility is to connect the internal indicator 17 to the battery of the vehicle via an adapter, such as a cigarette lighter adapter, for example (not shown). Of course, in other embodiments a wire or wires may also be used to connect the proximity sensor 15 with the internal indicator 17 within the vehicle passenger compartment 34 rather than using the wireless transmitter 20 and wireless receiver 21.

Figure 4:
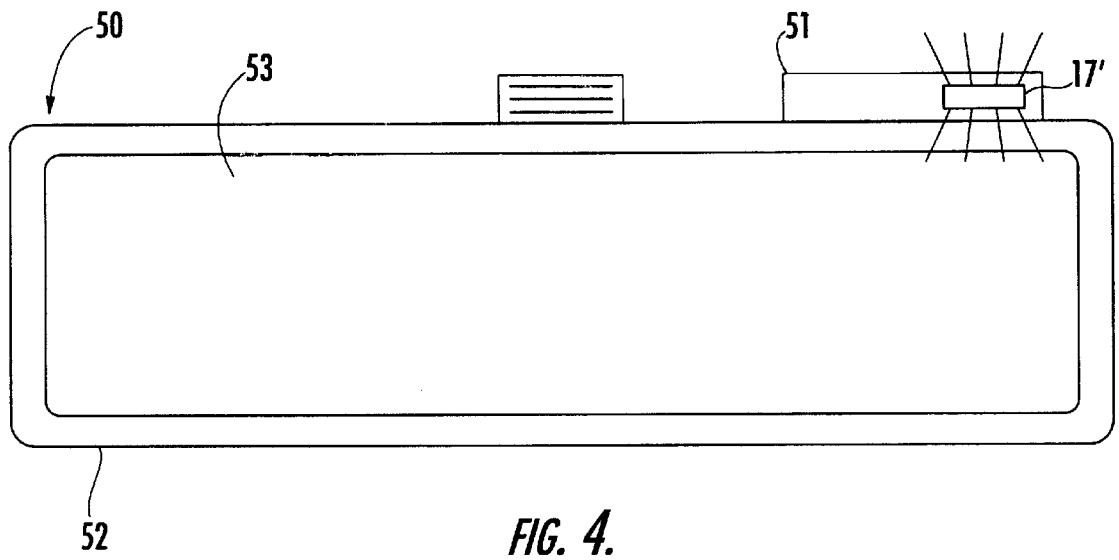
FIG. 4 is a perspective view of a vehicle rearview mirror illustrating one embodiment of an internal indicator as in the back-up warning system of FIG. 1.

Referring now additionally to FIG. 4, the internal indicator may be a visual warning indicator 17' which is part of a rearview mirror 50. The interior rearview mirror 50 includes a frame 52 with mirror glass 53 mounted therein, and a housing 51 is carried by the frame. As shown, the housing 51 includes a single light emitting diode (LED) 17' which may have a characteristic that varies with a distance between the rear of the vehicle 12 and the object 11. For example, the LED 17' may flash on and off at a frequency which becomes faster as the distance decreases and slower as the distance increases. As such, the driver will know how close the vehicle 12 is to the object 11 without having to get out of the vehicle to look. This may be particularly desirable for truck drivers backing up to a loading dock, drivers attempting to parallel park between two automobiles, and in numerous other situations. Of course, many other configurations are also possible, such as multiple LEDs each representing a particular distance to the object (e.g., four feet, three feet, etc.), for example.

Figure 5:
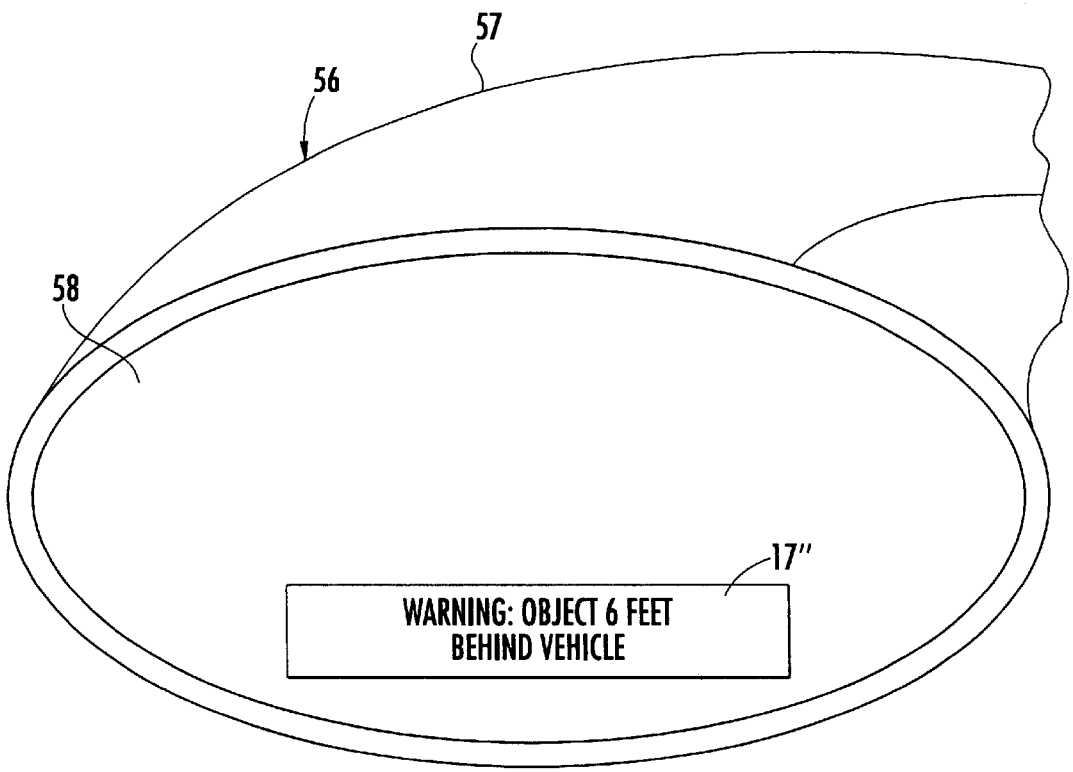
FIG. 5 is a perspective view of a vehicle side mirror illustrating another embodiment of an internal indicator as in the back-up warning system of FIG. 1.

Referring now additionally to FIG. 5, a visual warning indicator 17", such as an alphanumeric display, may also be carried by an exterior side mirror 56 of the vehicle 12. The exterior side mirror 56 includes a frame 57 with mirror glass 58 therein. The alphanumeric display 17" may provide a warning message as the object 11 comes within range of the proximity sensor 15. Moreover, the alphanumeric display 17" may display a distance from the license plate holder 60 to the object 11 that is updated as the distance changes. Of course, the alphanumeric display 17" may be carried by the interior rearview mirror 50, or the LED 17' may be carried by the exterior side mirror 56, for example. Many other visual warning indicators and combinations thereof may be used in accordance with the invention, as will be appreciated by those of skill in the art.

The internal indicator may be provided by an internal audible indicator 17 mounted with the vehicle passenger compartment 34. The internal audible indicator 17 may generate an audible tone that varies according to the proximity of the object 11 to the license plate holder 60. Other audible indications may also be provided.

The external audible indicator 18 may be connected to the back-up lighting circuit 14 so that when a reverse transmission is selected, the external audible indicator is activated. In these embodiments, the audible indication provided by the external audible indicator 18 may be a constant audible indication to provide an audible warning to pedestrians, for example, that are walking adjacent the license plate holder 60. In other embodiments, the external audible indicator 18 may be connected to the proximity sensor 15 as indicated by the dashed line. Accordingly, the external audible indication relates to the proximity of the object 11 to the license plate holder 60. Therefore, the external audible indication may be similar to the varying frequency or pattern of the internal audible indication. By way of example, the internal and external audible indicators 17, 18 may include speakers, piezoelectric elements, or other suitable devices known to those of skill in the art.

A method aspect-of the present invention is for making a back-up warning system for a vehicle comprising a back-up lighting circuit. The method may include providing a license plate holder 60 and a housing 64 connected thereto. The method may also include positioning an external audible indicator 18 in the housing 64 and connecting the external audible indicator in parallel to the back-up lighting circuit 14 for generating an external audible indication based on selection of the reverse transmission position. The method may further include positioning a proximity sensor 15 in the housing 64 for sensing objects 11 positioned rearward of the license plate holder 60 and positioning an internal indicator 17 within the vehicle passenger compartment 34 to cooperate with the proximity sensor 15. The method may still further include generating an indication of proximity of an object 11 to the license plate holder 60. The step of positioning the internal indicator 17 may also include positioning the internal indicator within the vehicle passenger compartment 34.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A back-up warning system for a vehicle comprising a back-up lighting circuit selectively powered upon selection of a reverse transmission position, the back-up warning system comprising:

a license plate holder for mounting and displaying a license plate;

a housing connected to said license plate holder;

an external audible indicator carried by said housing and connected to the back-up lighting circuit to be powered in parallel therewith for generating an external audible indication based upon selection of the reverse transmission position;

a proximity sensor carried by said housing for sensing proximity of an object positioned rearward of said license plate holder; and an internal indicator to be positioned within the vehicle and cooperating with said proximity sensor to generate an indication of proximity of the object to said license plate holder.

2. A back-up warning system according to claim 1 wherein the vehicle further comprises a vehicle passenger compartment; and wherein said internal indicator is positioned within the vehicle passenger compartment.

3. A back-up warning system according to claim 1 further comprising a wireless communications link connecting said proximity sensor and said internal indicator.

4. A back-up warning system according to claim 3 wherein said wireless communications link comprises:

a wireless transmitter connected to said proximity sensor; and a wireless receiver within the vehicle and connected to said internal indicator.

5. A back-up warning system according to claim 1 wherein said external audible indicator is connected to said proximity sensor.

6. A back-up warning system according to claim 5 wherein said external audible indicator generates an audible indication relating to proximity of the object to said license plate holder.

7. A back-up warning system according to claim 1 wherein said internal indicator comprises a visual warning indicator.

8. A back-up warning system according to claim 7 wherein the vehicle comprises at least one rearview mirror; and wherein said visual warning indicator is carried by the at least one rearview mirror.

9. A back-up warning system according to claim 1 wherein said proximity sensor comprises a radar sensor.

10. A back-up warning system according to claim 1 further comprising sensing circuitry carried by said proximity sensor; and wherein said sensing circuitry comprises a signal emitter for emitting signals, and a collector for collecting reflected signals from the object positioned rearward of said license plate holder.

11. A back-up warning system according to claim 1 wherein said license plate holder comprises:

a generally rectangular body portion with an opening therein to mount and display the license plate; and at least one bracket portion connected to said body portion for facilitating mounting of said license plate holder to the rear of the vehicle.

12. A back-up warning system for a vehicle comprising a back-up lighting circuit selectively powered upon selection of a reverse transmission position, the back-up warning system comprising:

a license plate holder for mounting and displaying a license plate;

a housing connected to said license plate holder;

a proximity sensor carried by said housing for sensing proximity of an object positioned rearward of said license plate holder;

an internal indicator to be positioned within the vehicle and cooperating with said proximity sensor to generate an indication of proximity of the object to said license plate holder; and an external audible indicator connected to the back-up lighting circuit to be powered in parallel therewith and connected to said proximity sensor for generating an audible indication relating to proximity of the object to said license plate holder.

13. A back-up warning system according to claim 12 wherein said external audible indicator is carried by said housing for generating an external audible indication based upon selection of the reverse transmission.

14. A back-up warning system according to claim 12 wherein the vehicle further comprises a vehicle passenger compartment; and wherein said internal indicator is positioned within the vehicle passenger compartment.

15. A back-up warning system according to claim 12 further comprising a wireless communications link connecting said proximity sensor and said internal indicator.

16. A back-up warning system according to claim 15 wherein said wireless communications link comprises:

a wireless transmitter connected to said proximity sensor; and a wireless receiver within the vehicle and connected to said internal indicator.

17. A back-up warning system according to claim 12 wherein said internal indicator comprises a visual warning indicator.

18. A back-up warning system according to claim 17 wherein the vehicle comprises at least one rearview mirror; and wherein said visual warning indicator is carried by the at least one rearview mirror.

19. A back-up warning system according to claim 12 wherein said proximity sensor comprises a radar sensor.

20. A back-up warning system according to claim 12 further comprising sensing circuitry carried by said proximity sensor; and wherein said sensing circuitry comprises a signal emitter for emitting signals, and a collector for collecting reflected signals from the object positioned rearward of said license plate holder.

21. A back-up warning system according to claim 12 wherein said license plate holder comprises:

a generally rectangular body portion with an opening therein to mount and display the license plate; and at least one bracket portion connected to said body portion for facilitating mounting of said license plate holder to the rear of the vehicle.

22. A back-up warning system for a vehicle comprising a back-up lighting circuit selectively powered upon selection of a reverse transmission position, the back-up warning system comprising:

a license plate holder for mounting and displaying a license plate;

a housing connected to said license plate holder;

a proximity sensor carried by said housing for sensing proximity of an object positioned rearward of said license plate holder;

an internal indicator to be positioned within the vehicle and cooperating with said proximity sensor to generate an indication of proximity of the object to said license plate holder;

an external audible indicator carried by said housing and connected to the back-up lighting circuit to be powered in parallel therewith; and a wireless communications link connecting said proximity sensor and said internal indicator, said wireless communications link comprising a wireless transmitter connected to said proximity sensor, and a wireless receiver within the vehicle and connected to said internal indicator.

23. A back-up warning system according to claim 22 wherein the vehicle further comprises a vehicle passenger compartment; and wherein said internal indicator is positioned within the vehicle passenger compartment.

24. A back-up warning system according to claim 22 wherein said internal indicator comprises a visual warning indicator.

25. A back-up warning system according to claim 24 wherein the vehicle comprises at least one rearview mirror; and wherein said visual warning indicator is carried by the at least one rearview mirror.

26. A back-up warning system according to claim 22 wherein said proximity sensor comprises a radar sensor.

27. A back-up warning system according to claim 22 further comprising sensing circuitry carried by said proximity sensor; and wherein said sensing circuitry comprises a signal emitter for emitting signals, and a collector for collecting reflected signals from the object positioned rearward of said license plate holder.

28. A back-up warning system according to claim 22 wherein said license plate holder comprises:
   a generally rectangular body portion with an opening therein to mount and display the license plate; and
   at least one bracket portion connected to said body portion for facilitating mounting of said license plate holder to the rear of the vehicle.

29. A method for making a back-up warning system for a vehicle comprising a back-up lighting circuit selectively powered upon selection of a reverse transmission position, the method comprising:
   providing a license plate holder and a housing connected thereto;
   positioning an external audible indicator in the housing;
   connecting the external audible indicator in parallel to the back-up lighting circuit for generating an external audible indication based on selection of the reverse transmission position;
   positioning a proximity sensor in the housing for sensing objects positioned rearward of the license plate holder; and
   positioning an internal indicator within the vehicle passenger compartment to cooperate with the proximity sensor and generating an indication of proximity of an object to the license plate holder.

30. A method according to claim 29 wherein the vehicle further comprises a vehicle passenger compartment; and wherein positioning the internal indicator comprises positioning the internal indicator within the vehicle passenger compartment.

31. A method according to claim 29 wherein the internal indicator comprises a wireless internal indicator.

32. A method according to claim 29 wherein the proximity sensor comprises a radar sensor.

\* \* \* \* \*